United States Patent [19]
Harjula et al.

[11] Patent Number: 5,218,917
[45] Date of Patent: Jun. 15, 1993

[54] ICEBREAKING SHIP

[75] Inventors: Arjo Harjula, Espoo; Pekka Salmi, Vantaa, both of Finland

[73] Assignee: Kvaerner Masa-Yards Oy, Helsinki, Finland

[21] Appl. No.: 851,085

[22] Filed: Mar. 13, 1992

[30] Foreign Application Priority Data

Mar. 18, 1991 [FI] Finland .................. 911302

[51] Int. Cl.$^5$ .............................................. B63B 35/08
[52] U.S. Cl. ....................................................... 114/40
[58] Field of Search ................ 114/40, 41, 42, 56, 114/57, 230

[56] References Cited

U.S. PATENT DOCUMENTS

| | | | |
|---|---|---|---|
| 2,953,113 | 9/1960 | Baer | 115/42 |
| 3,841,252 | 10/1974 | Bennett et al. | 114/40 |
| 3,931,780 | 1/1976 | Waas | 114/41 |
| 3,985,091 | 10/1976 | Waas | 114/40 |
| 4,781,135 | 11/1988 | Lindqvist | 114/40 |
| 4,942,837 | 7/1990 | Hellmann et al. | 114/40 |

FOREIGN PATENT DOCUMENTS

| | | |
|---|---|---|
| 76977 | 9/1988 | Finland . |
| 85967 | 9/1988 | Finland . |
| 872326 | 11/1988 | Finland . |

Primary Examiner—Jesus D. Sotelo
Assistant Examiner—Stephen P. Avila
Attorney, Agent, or Firm—Dellett, Smith-Hill and Bedell

[57] ABSTRACT

An icebreaking ship has a hull including a forward part and an aft part and a screw arrangement in the aft part of the ship. The screw arrangement is designed for propulsion of the ship in the forward direction and is turnable substantially in a horizontal plane, whereby the screw arrangement serves for steering the ship. The screw arrangement and the form of the hull of the ship are dimensioned and designed for allowing the ship to move in the aft direction in heavy ice conditions.

28 Claims, 3 Drawing Sheets

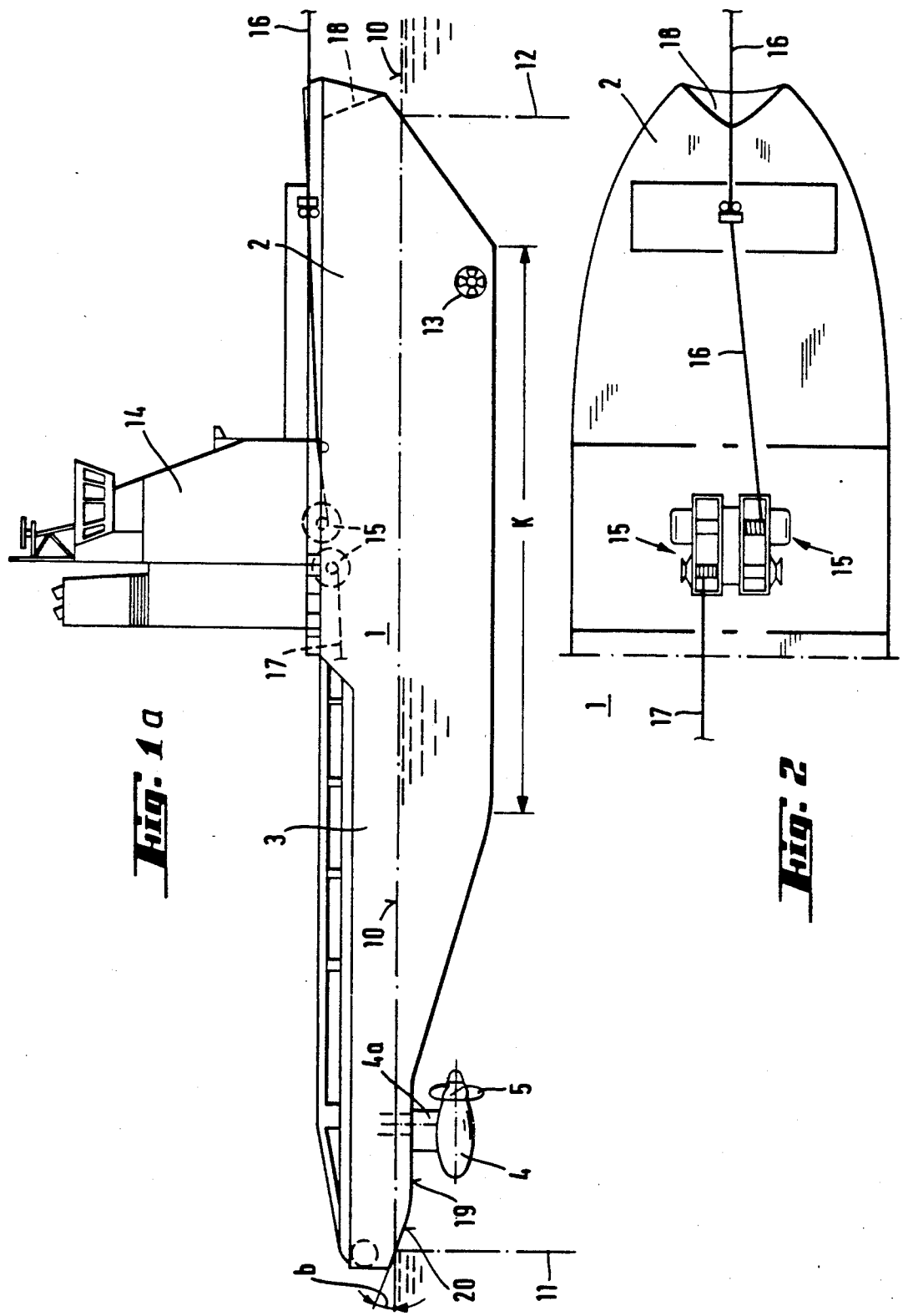

ICEBREAKING SHIP

BACKGROUND OF THE INVENTION

This invention relates to an icebreaking ship.

A conventional icebreaker is a special purpose vessel the design of which is made with emphasis on its icebreaking characteristics. The operating season of an icebreaker is normally only a few months in each year, which means that during the greater part of the year the money invested in an icebreaker is non-performing. Hence, there is a need for developing the conventional icebreaker so that without impairing its icebreaking characteristics it should also be able to serve another purpose, for instance, as an off-shore supply vessel, a diving support vessel, a towing vessel and/or a research vessel.

The bow form of an icebreaker in accordance with contemporary designs is not sharp, as in a ship designed only for navigation in open water. In accordance with contemporary designs, the bow form of an icebreaker, when viewed in horizontal section in the vicinity of the design waterline, is either rounded with a large radius of curvature or is completely flat over a large part of the width of the ship. See, for example, Canadian Patent 1,026,160. An extreme example of this type of design is the Swedish icebreaker ODEN, which was built in 1988. The bow of the ODEN, when viewed in horizontal section, has a flat central portion nearly 20 m wide. Such an extremely flattened bow is designed for difficult ice conditions, and is not favorable for operation in open water. In particular, the resistance to movement in open water is high and wave impact blows are very strong.

Most conventional ships employ pushing screws, i.e. screws that are aft of the shaft that delivers torque to the screw and transmits thrust from the screw to the hull of the ship, as propulsion means It is also known to employ pulling screws as propulsion means for a ship. For example, Finnish examined patent publication 76977 discloses a ship that is provided in its aft part with a pulling screw. The propulsion force provided by a pulling screw is transmitted to the hull of the ship by a shaft that is in tension.

Icebreakers have been constructed with two forwardly projecting pulling bow screws that give about 40% of the screw thrust of the vessel. In such a vessel, the bow screws produce water streams that function as a lubricant between the hull and the surrounding ice.

A ship's rudder causes a ship to turn by forcing the aft part of the ship sideways. When a conventional icebreaker is moving in the forward direction along a channel in an ice field, the edges of the ice field resist sideways movement of the aft part of the icebreaker, impairing the maneuverability of the ship.

SUMMARY OF THE INVENTION

The object of the invention is to create an effective icebreaker that may also be used advantageously for many other purposes.

The invention is based on the idea that an icebreaker only relatively rarely works in extremely difficult ice conditions and fulfills the main part of its icebreaking function in light or medium conditions. Consequently, it is warranted to use special solutions in heavy ice conditions. According to the invention, the ship is simply turned around to move in the aft direction in heavy ice conditions. The conventional form of the aft part of a vessel corresponds largely to the bow form of a modern effective icebreaker. In addition, movement in the aft direction in heavy ice conditions brings about the advantage that the screws of the ship produce water streams, which work as an effective lubricant between the hull of the ship and the surrounding ice.

In this specification, the term "forward part" relates to the part of the ship that is designed to be in front when the ship is navigating on a vector in open water, as distinct from maneuvering in a harbor, and the "aft part" of the ship is the region at the opposite end of the ship from the forward part. The term "forward direction" means the direction from the aft part to the forward part, and the term "aft direction" means the direction from the forward part to the aft part.

Because a ship according to the invention moves in heavy ice conditions in its aft direction, the bow of the ship can be optimized for use in open water and can also in other respects be optimized for other service than ice penetration. For example, the bow of a ship according to the invention, when viewed in horizontal section in the vicinity of the design waterline, may be much more pointed than required for optimum icebreaking performance in the conditions for which the ship is designed.

In a ship according to the invention the problems caused by a conventional rudder must be considered. When a ship moves in its aft direction in ice, the rudder may be damaged. If there are twin rudders side-by-side, ice pieces may wedge themselves into the space between the rudders and form a large accumulation of ice, which cannot easily be removed. These difficulties are eliminated in a ship according to the invention by providing the ship with a turnable screw arrangement instead of a rudder. It is well known that a turnable screw arrangement can be used to steer a ship and thus serves also as a rudder. A screw arrangement can easily be designed to withstand heavy ice loads and the screw itself may work as an effective disintegrator of ice ridges. Thus, the screw acts as a milling cutter for disintegrating the ridge, and since the ice pieces are normally only loosely interconnected, the screw also throws the ice pieces aside. Because the maneuverability of an icebreaker is relatively important, a ship according to the invention is preferably provided with two turnable screw arrangements side by side. By these means the ship can turn effectively. The turning angle of each screw arrangement should be at least 125°, preferably at least 250°. The most favorable solution is a screw arrangement having a turning angle of 360° and preferably even more.

Provided that the turning angle of the screw arrangement is large enough, the most favorable solution is to use a screw which is optimized to rotate in one direction. This will give the greatest screw thrust. The screw should preferably be at the front of the screw arrangement in the moving direction of the ship irrespective of whether the ship is moving in the forward or aft direction. When the ship is moving in the forward direction with the screw arrangement so turned that the screw is far from the aft end of the ship, i.e. the screw is forward of the vertical turning axis of the screw arrangement, the screw does not easily come into contact with wires, cables, chains or the like reaching from the ship down into the sea. When driving the ship in the aft direction with the screw turned to its rearmost position, the screw is favorably positioned for disintegrating ice ridges.

It is important that there is, all around the screw arrangements, sufficient free space for ice chunks broken by the ship. Thus, there should be a substantially horizontal hull bottom surface above the screw arrangement and this surface should be spaced from the volume swept by the screw during rotation by a distance that is equal to or greater than the maximum thickness of level ice the ship is designed to break. This maximum ice thickness is an important design parameter determining to a large extent the design of any ice-going ship.

The maneuverability of the ship can also be increased by making the middle part of the hull, that is, the part of the hull over which the draft of the ship is substantially the maximum, relatively short. In a preferred embodiment, the length of the middle part is at the most ⅔, preferably at the most ½, of the waterline length of the ship.

In heavy ice conditions an icebreaker often has to tow vessels of inferior ice penetration capability. In a ship according to the invention the towing equipment is preferably so arranged that a towing winch or the like is arranged to work over the forward part of the ship, when the ship moves in the aft direction. In a still more flexible and more practical arrangement, the towing equipment is arranged so that is may work alternatively over the ship s forward part or over its aft part. If the towing equipment is designed to work mainly over the forward part, the aft part of the ship may be left free for any equipment needed for special purpose work.

In order to make the ship an effective icebreaker when it moves in its aft direction, the aft part of the ship should have, at and below the level of the ship's design waterline, an oblique icebreaking surface that, when viewed in a vertical plane parallel to the central plane of the ship, an angle of at most 40°, preferable at most 20°, relative to a horizontal plane.

For obtaining effective breaking of level ice it is important that the oblique icebreaking surface reaches down a sufficient distance below the design waterline of the ship. The distance should be equal to or greater than the maximum thickness of level ice the ship is designed to break.

In a preferred embodiment the icebreaking surface includes a pair of obliquely arranged ice guiding surfaces to the aft of the ship with respect to each screw arrangement. The two surfaces of each pair, when viewed in a vertical cross-section plane of the ship, diverge in an upward direction from an area aft of the screw arrangement and are disposed at an angle of at least 7° relative to a horizontal plane. The ice guiding surfaces may meet to form a blunt edge aft of each screw arrangement, or there may be a flat surface, or preferably a ridge, between the ice guiding surfaces of each pair.

Further icebreaking improvement is obtained by making the aft part of the hull of the ship, in the area of the design waterline of the ship, considerably broader than at the corresponding portion of the central cross-section of the hull.

BRIEF DESCRIPTION OF THE DRAWINGS

In the following the invention will be described more in detail with reference to the attached drawings, in which.

DETAILED DESCRIPTION

Figure 1B:
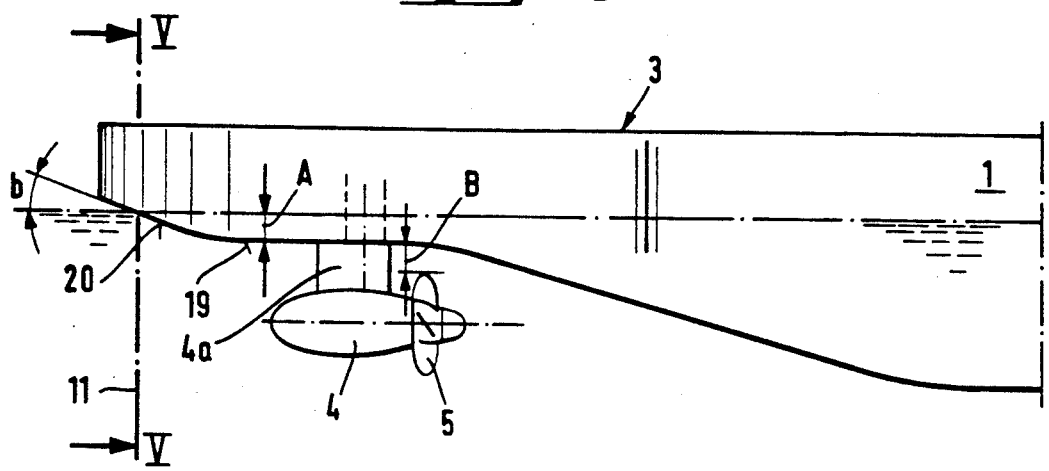
FIG. 1a schematically shows a general side view of a ship according to the invention, FIG. 1b schematically shows a simplified side view of the aft part of a ship according to the invention, FIG. 2 schematically shows the front part of a ship according to FIG. 1a seen from above, FIG. 3 schematically shows the aft part of the ship of FIG. 1b, seen from below, FIG. 4 schematically shows a rear view of the ship of FIGS. 1b and 3, FIG. 5a-5c schematically show three different modified embodiments of a part of section V—V of FIG. 1b.

In the drawings, 1 indicates the hull of a ship, 2 the forward part of the ship and 3 the aft part of the ship. The ship is designed for breaking level ice of a predetermined maximum thickness. The hull of the ship is designed for ice penetration in heavy ice conditions when the ship is moving in the aft direction. Therefore, the aft part of the hull is designed, with respect to both form and strength, for ice penetration, and the hull as a whole is designed for operation of the ship in ice of the predetermined maximum thickness.

Figure 3:
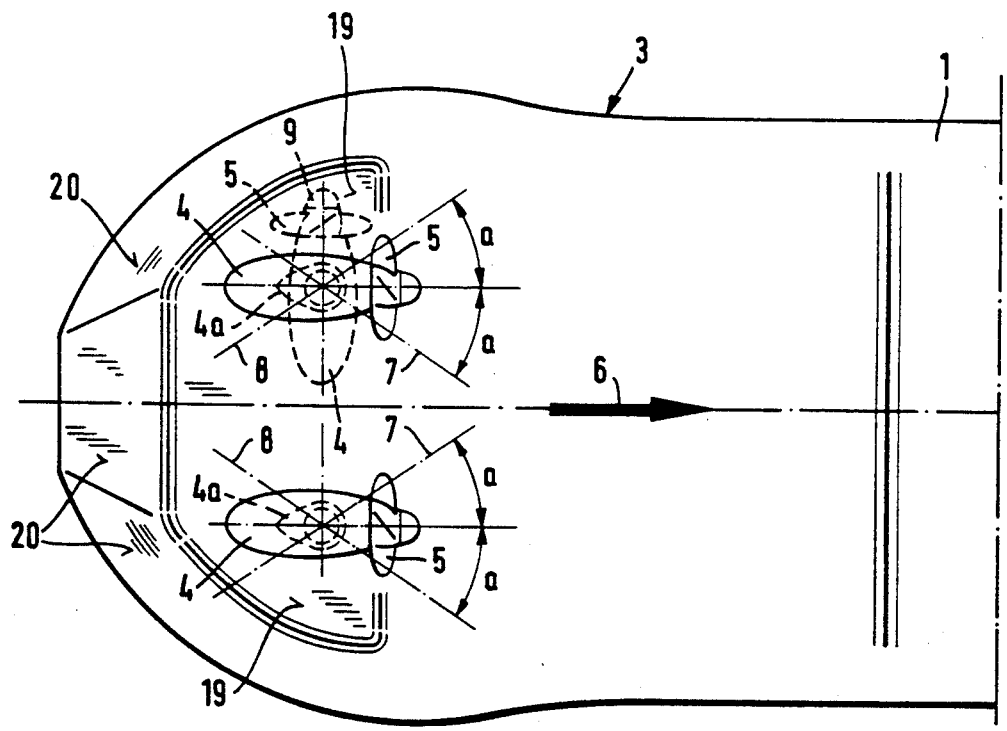

In the aft part of the ship there is at least one turnable screw arrangement 4 that is turnable relative to the ship's hull about a vertical axis. There are preferably two of these screw arrangements in the ship as shown in FIG. 3 and these screw arrangements are the main propulsion means of the ship. The screw arrangements may be of the kind disclosed in Finnish examined patent application publication 76977 or may be any other turnable screw arrangement of sufficient strength. The screw arrangement 4 has at one end a screw 5 that is optimized to rotate in one direction, in which the screw functions as a pulling screw. In FIG. 1a the ship is ready for movement in the forward direction.

In FIG. 3 the maximum turning angle of each screw arrangement required for normal maneuvering is shown by the letter a. This angle is normally about 35°. The ship's forward direction is shown by an arrow 6.

If the screw rotates only in one direction and the same maneuverability is required when the ship moves in the aft direction as when the ship moves in the forward direction, the screw arrangement must be turnable 180° from the position shown by full lines in FIG. 3 to a position for propelling the ship in the aft direction and ±35° from that position. This means that the starboard (upper) screw arrangement must be turnable counterclockwise in FIG. 3 from the position shown by the line 7 to the position shown by the line 8 and the port (lower) screw arrangement must be turnable clockwise from the position shown by the line 7 to the position shown by the line 8. If the angle a is 35°, the total turning angle of each screw arrangement is 250°.

Maneuverability is important in icebreakers and also in other support vessels. Hence, it is of advantage that the screw arrangement 4 can be turned also into the crosswise position 9 shown by dashed lines with the screw outwards. If maximum side thrust is desirable, the total turning angle of the screw arrangement has to be at least 305°. The screw arrangement must in this case be turnable to all the positions shown in FIG. 3 and in addition to the mirror image position of position 9, which means that the turning angle of the screw arrangement must be enlarged by an angle equal to the difference between a right angle and the angle a.

If the screw is rotatable in both directions, it is sufficient that the limit positions of the screw arrangement are the positions 7 and 9. In that case the required turning angle is only 125°. When the ship is moving in the aft direction, steering is effected by the screw arrangements by forcing the aft part of the ship sideways, but since the aft part of the ship is the leading part with respect to the direction of motion, the heading of the ship is changed quite readily. Therefore a ship in accordance with the invention can break out of an existing narrow channel into the surrounding unbroken ice more readily than a ship that is moving in the forward direction.

When the ship has two screw arrangements they should be turnable independently of each other and the distance between them must be sufficient that they can be turned without mutual contact. In addition it is desirable that each screw arrangement be at a sufficient distance from the outer sides of the ship that at no position of the screw arrangement does the screw extend horizontally beyond the sides of the ship. One or several bow thrusters 13 allow the ship to be used in an operation requiring dynamic positioning.

In FIG. 1a, the design waterline of the ship is indicated by the numeral 10. The waterline length of the ship is the distance between the vertical lines 11 and 12 that intersect the central plane of the ship at the design waterline. The middle portion of the ship, over which its draft is at least 90% of the ship's maximum draft, has a length K that is smaller than one half of the waterline length of the ship. If the length K is great, this has an unfavorable influence on the maneuverability of the ship. The maneuverability may be improved by providing the ship with downwards/inwards sloping side surfaces. The more sloping the sides of the ship are below the waterline, the longer the middle portion K may be.

Between the forward and aft walls of the superstructure 14 of the ship there is a winch arrangement 15, including several towing winches, which may work forwards over the ship's forward part as well as backwards over the ship s aft part. When a towing winch works in the direction of the forward part of the ship, the towing wire may run as shown by numeral 16, and when a towing winch works in the direction of the aft part of the ship, the towing wire may run as shown by numeral 17. In the forward part of the ship there is a so-called towing fork 18 into which the stem of a towed ship is placed when it is towed in heavy ice conditions by a ship according to the invention moving it its aft direction. Towing in the aft direction may be carried out, for instance, when geophysical research is being performed, because in that case it is normally important that the underwater noise caused by the screws should not disturb the function of research equipment and therefore it is desirable that the screws of the towing vessel be as far as possible from the towed object.

As evident from FIGS. 1a and 1b, the large aft part 3, aft of the superstructure 14, is fully available for special arrangements. The rear deck may, for instance, include a landing place for a helicopter, room units provided with research equipment, winches, hoists, cargo, measuring equipment etc. These items are not shown in the drawing, because they may be of any kind. The manner in which the aft portion of the ship is equipped can be freely chosen according to the intended use.

At the aft end of the ship, in the area of and below the design waterline 10, there is an oblique icebreaking surface 20, the angle b of which relative to a horizontal plane is about 20°. This angle can be smaller but should preferably not be greater 40°. As shown in FIG. 3, the icebreaking surface may. include a substantially flat region that is bisected by the central plane of the ship.

As shown in FIG. 1b there is a substantially horizontal flat hull bottom surface 19 above the screw arrangements 4. The surface 19 forms the limit of the icebreaking surface 20 and is at a distance A from the design waterline 10. The distance A is equal to or preferably greater than the maximum thickness of level ice the ship is designed to break.

Between the screws 5 and the hull 1 of the ship there is a free space of height B equal to or greater than the maximum thickness of level ice the ship is designed to break. This space allows chunks to pass under the surface 19 without contacting the screws.

The vertical shaft 4a of each screw arrangement is, as indicated in FIG. 3 surrounded by a streamlined shell that turns together with the screw arrangement 4. The streamlined shell is teardrop-shaped in cross-section with the blunt end of the teardrop facing the screw 5.

Figure 4:
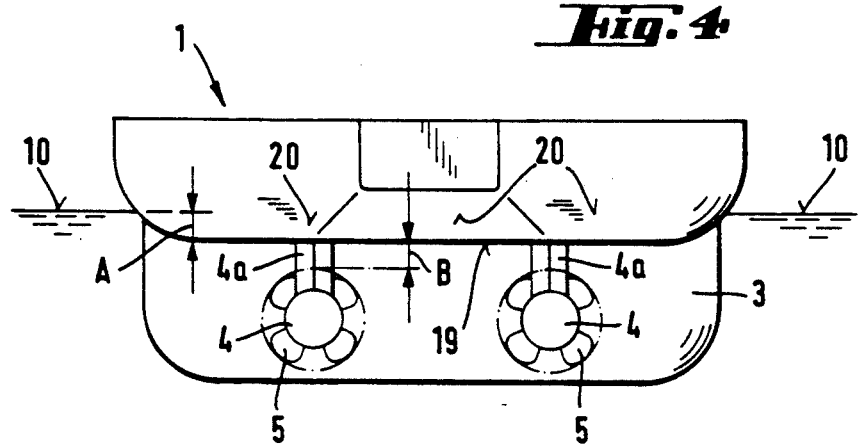

As evident from FIGS. 3 and 4 the aft part 3 of the hull 1 includes a sideways enlarged part at the aft end of the hull. The maximum width of this part should preferably be about 110% of the width of hull over the middle portion of the ship. It is not normally recommended that the width of the enlarged part be more than 125% of the width of the hull over the middle portion of the ship because of the increased movement resistance it causes, but a width of 125% or more is within the scope of the invention, if an increased movement resistance is for some reason acceptable.

Figure 5A:
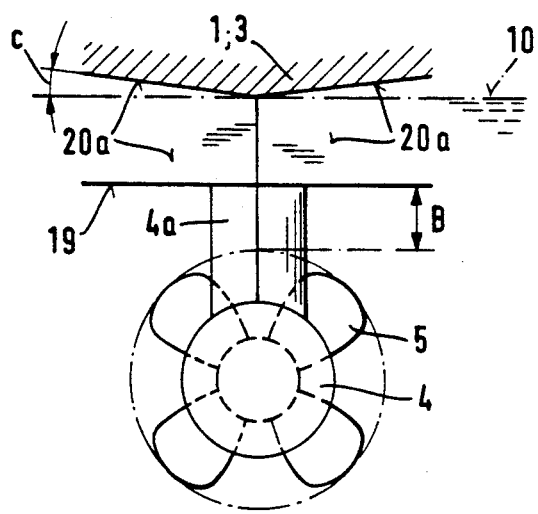
Figure 5B:
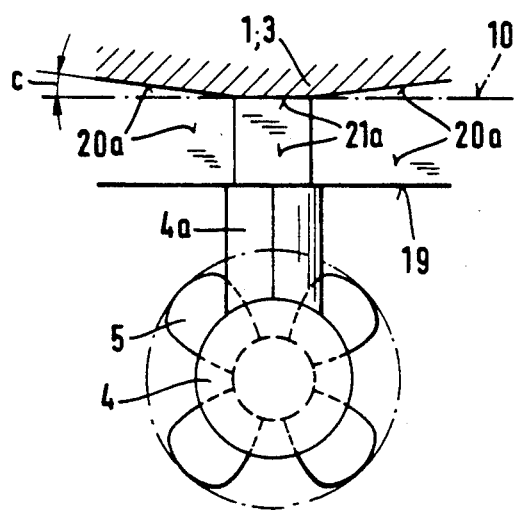
Figure 5C:
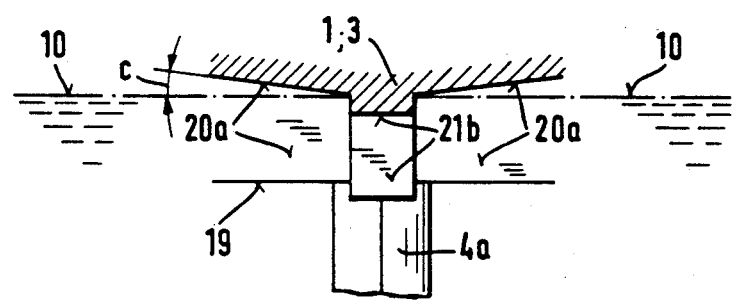

FIGS. 5a–5c show details of the icebreaking surface 20. In a preferred embodiment the surface 20, when seen in vertical cross-section, is given a non-linear profile including sideways sloping ice guiding surfaces 20a with a slope angle c of at least 7° relative to a horizontal plane, for instance the design waterline plane 10. The sloping surfaces 20a may meet aft of the screw arrangement 4, as shown in FIG. 5a, or there may be a flat surface 21a or a ridge 21b between the sloping surfaces, as shown in FIGS. 5b and 5c respectively.

Because a ship according to the invention moves in the aft direction in heavy ice conditions it is not necessary to optimize its forward part for ice penetration, but it can be designed to meet other important requirements. It will be understood by those skilled in the art that a ship is subject to "heavy ice conditions" when it is moving in unbroken level ice of a thickness equal to or almost equal to the maximum thickness the ship is designed to break, or the ship is penetrating ice ridges (agglomerations of ice pieces piling up due to movements in the ice field), or is subject to severe ice pressure from the sides due to movements in the ice field.

The invention is not restricted to the embodiments shown, but several modifications are feasible within the scope of the attached claims.

We claim:

1. An icebreaking ship having a hull including a forward part and an aft part and propulsion means in the aft part of the ship, the form of the hull in the aft part of the ship being optimized for ice penetration by movement of the ship in the aft direction and the form of the hull in the forward part of the ship being optimized for purposes other than ice penetration by movement of the ship in the forward direction, the propulsion means comprising at least one screw arrangement designed for serving as the main propulsion means of the ship in the forward and aft directions, the screw arrangement including a screw and being turnable substantially in a horizontal plane, whereby the propulsion means serve as steering means of the ship, the propulsion means and the hull of the ship being dimensioned and designed for operation in heavy ice conditions in the aft direction of the ship.

2. A ship according to claim 1, wherein the propulsion means comprise two turnable screw arrangements side-by-side in a manner allowing them to turn freely with respect to one another.

3. A ship according to claim 1, in which the screw arrangement is designed to have its screw in front of the screw arrangement relative to the moving direction of the ship, irrespective of whether the ship is moving in the forward direction or the aft direction.

4. A ship according to claim 3, in which the screw of the screw arrangement is optimized for rotation in only one direction.

5. A ship according to claim 1, in which the screw of the screw arrangement is optimized for rotation in only one direction.

6. A ship according to claim 1, wherein the hull includes a substantially horizontal bottom surface above the propulsion means at a distance from the propulsion means such that the minimum distance between the screw and the horizontal bottom surface is at least as great as the maximum thickness of level ice the ship is designed to break.

7. A ship according to claim 6, wherein the distance between the horizontal bottom surface and the design waterline plane is at least as great as the maximum thickness of level ice the ship is designed to break.

8. A ship according to claim 6, wherein the aft part has, in the area of and below the design waterline, an oblique icebreaking surface that is inclined relative to a horizontal plane at an angle of 40° at most.

9. A ship according to claim 8, wherein the icebreaking surface includes a pair of obliquely arranged ice guiding surfaces to the aft of the ship with respect to each screw arrangement, and wherein the surfaces of each pair, in a vertical cross-section of the ship, slope upwards and outwards from an area aft of the screw arrangement at an angle of at least 7° relative to a horizontal plane.

10. A ship according to claim 9, in which there is a ridge between the ice guiding surfaces of each pair.

11. A ship according to claim 9, in which there is a flat surface between the ice guiding surfaces of each pair.

12. A ship according to claim 8, in which the icebreaking surface extends down below the design waterline by a distance that is at least as great as the maximum thickness of level ice the ship is designed to break.

13. A ship according to claim 1, wherein the aft part has, in the area of and below the design waterline, an oblique icebreaking surface that is inclined relative to a horizontal plane at an angle of 40° at most.

14. A ship according to claim 13, wherein said angle is 20° at most.

15. A ship according to claim 13, wherein the icebreaking surface includes a pair of obliquely arranged ice guiding surfaces to the aft of the ship with respect to each screw arrangement, and wherein the surfaces of each pair, in a vertical cross-section of the ship, slope upwards and outwards from an area aft of the screw arrangement at an angle of at least 7° relative to a horizontal plane.

16. A ship according to claim 15, in which there is a ridge between the ice guiding surfaces of each pair.

17. A ship according to claim 15, in which there is a flat surface between the ice guiding surfaces of each pair.

18. A ship according to claim 1, in which the aft part of the hull of the ship is, in the area of the design waterline of the ship, considerable broader than at the corresponding portion of the central cross-section of the hull.

19. A ship according to claim 1, in which there is, between the front part and the aft part of the ship, a middle hull portion reaching at least substantially down to the maximum draft of the ship, the length of the middle hull portion being at the most two-thirds of the design waterline length of the ship.

20. A ship according to claim 19, wherein the length of the middle hull portion is at most one-half of the waterline length of the ship.

21. A ship according to claim 1, having a towing winch, which is arranged to work in a direction over the front part of the ship when the ship moves in the aft direction.

22. A ship according to claim 21, in which the towing winch is arranged to work alternatively in the direction of the forward part or the aft part of the ship.

23. A ship according to claim 1, in which there is, at or close to the aft part of the ship, a free area for the installation of equipment serving other purposes than towing in heavy ice.

24. A ship according to claim 1, wherein the form of the hull in the forward part of the ship is optimized for navigation in open water.

25. A method of operating a ship having a hull including a forward part and an aft part and propulsion means in the aft part of the ship, the form of the hull in the aft part of the ship being optimized for ice penetration by movement of the ship in the aft direction and the form of the hull in the forward part of the ship being optimized for purposes other than ice penetration by movement of the ship in the forward direction, the propulsion means comprising at least one screw arrangement designed for serving as the main propulsion means of the ship in the forward and aft directions, the screw arrangement including a screw and being turnable substantially in a horizontal plane, the method comprising:
  in open water and in light ice conditions, employing the screw arrangement for propulsion of the ship in the forward direction,
  in heavy ice conditions, employing the screw arrangement for propulsion of the ship in the aft direction, whereby the aft part of the ship is used for ice penetration, and
  in open water and in all ice conditions, using the propulsion means to steer the ship.

26. A method according to claim 25, wherein the screw is optimized for rotation in only one direction and the method comprises turning the screw arrangement so that in open water and in light ice conditions rotation of the screw in said one direction provides propulsion force in the forward direction and in heavy ice conditions rotation of the screw in said one direction provides propulsion force in the opposite direction.

27. A method according to claim 25, comprising using the screw as a pulling screw both for propulsion in the forward direction and for propulsion in the aft direction.

28. A method according to claim 25, wherein the form of the hull in the forward part of the ship is optimized for navigation in open water.

* * * * *